United States Patent
Mlinaric et al.

(10) Patent No.: US 11,852,051 B2
(45) Date of Patent: Dec. 26, 2023

(54) RECIRCULATING HYDRAULIC FLUID CONTROL VALVE

(71) Applicant: Schaeffler Technologies AG & Co. KG, Herzogenaurach (DE)

(72) Inventors: Andrew Mlinaric, Lakeshore (CA); Gustavo de Oliveira Figueiredo, Sterling Heights, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/341,564

(22) Filed: Jun. 8, 2021

(65) Prior Publication Data

US 2021/0388744 A1 Dec. 16, 2021

Related U.S. Application Data

(60) Provisional application No. 63/038,889, filed on Jun. 14, 2020.

(51) Int. Cl.
*F01L 1/344* (2006.01)
*F16K 11/07* (2006.01)
*F16K 31/06* (2006.01)

(52) U.S. Cl.
CPC ..... *F01L 1/3442* (2013.01); *F01L 2001/3443* (2013.01); *F01L 2001/34426* (2013.01); *F01L 2001/34433* (2013.01); *F16K 11/0716* (2013.01); *F16K 31/0613* (2013.01)

(58) Field of Classification Search
CPC .......... F01L 1/3442; F01L 2001/34426; F01L 2001/34433; F01L 2001/3443; F01L 1/047; F16K 11/0716; F16K 31/0613

USPC ............................................ 123/90.17, 90.15
See application file for complete search history.

(56) References Cited

U.S. PATENT DOCUMENTS

| | | | | |
|---|---|---|---|---|
| 7,000,580 B1 * | 2/2006 | Smith | ............... | F01L 1/3442 |
| | | | | 123/90.17 |
| 7,950,361 B2 * | 5/2011 | Takenaka | ............... | F01L 1/3442 |
| | | | | 123/90.17 |
| 8,522,733 B2 * | 9/2013 | Hoppe | ............... | F01L 1/3442 |
| | | | | 123/90.15 |
| 9,784,143 B2 | 10/2017 | Snyder et al. | | |
| 2009/0020718 A1 * | 1/2009 | Stallmann | ............ | F16K 11/0716 |
| | | | | 251/324 |
| 2009/0107433 A1 * | 4/2009 | Tanaka | ............... | F01L 1/3442 |
| | | | | 123/90.17 |
| 2012/0152195 A1 * | 6/2012 | Schulze | ............... | F01L 1/3442 |
| | | | | 123/90.17 |
| 2013/0206088 A1 | 8/2013 | Wigsten | | |

(Continued)

FOREIGN PATENT DOCUMENTS

| CN | 110318836 A | 10/2019 |
|---|---|---|
| CN | 110318838 A | 10/2019 |

(Continued)

*Primary Examiner* — Wesley G Harris

(57) ABSTRACT

A single unit solenoid-controlled hydraulic fluid control valve (HFCV) configured to recirculate an exiting hydraulic fluid from a first hydraulic actuation chamber to a second hydraulic actuation chamber is provided. The HFCV includes a selectively movable spool having an inner fluid chamber configured to receive and deliver the exiting hydraulic fluid to one or both of either a sump or one of the first or second hydraulic actuation chambers.

18 Claims, 5 Drawing Sheets

(56) References Cited

U.S. PATENT DOCUMENTS

| | | | |
|---|---|---|---|
| 2014/0311333 A1* | 10/2014 | Hutzelmann | F01L 1/3442 91/418 |
| 2015/0218977 A1* | 8/2015 | Hofmann | F01L 1/3442 123/90.17 |
| 2017/0058726 A1 | 3/2017 | Smith et al. | |
| 2018/0363514 A1 | 12/2018 | Stanhope | |
| 2019/0107014 A1 | 4/2019 | Smith | |
| 2019/0234244 A1 | 8/2019 | Hisaeda et al. | |
| 2021/0215070 A1 | 7/2021 | Figueiredo et al. | |

FOREIGN PATENT DOCUMENTS

| | | |
|---|---|---|
| CN | 110359976 A | 10/2019 |
| JP | 2019132265 A | 8/2019 |
| JP | 2020024018 A | 2/2020 |
| WO | 2020008626 A1 | 1/2020 |

* cited by examiner

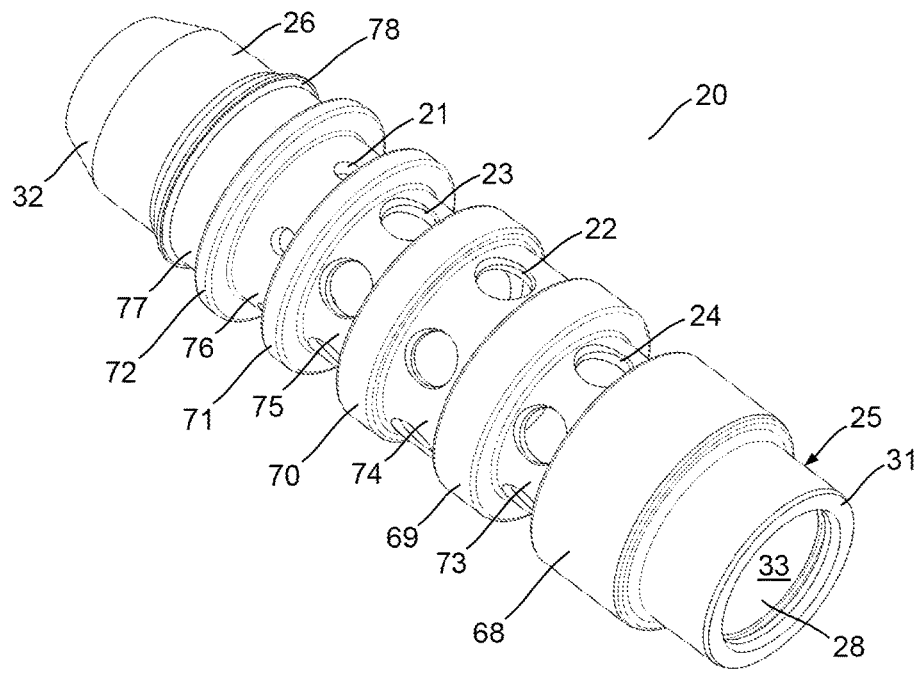
Figure 5
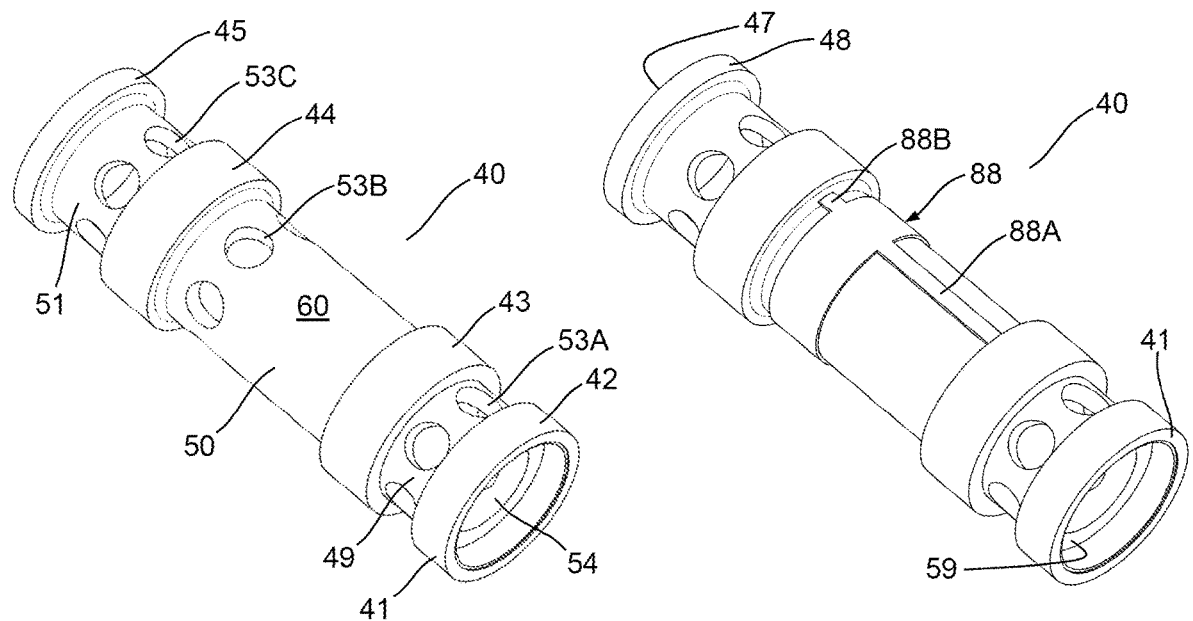
Figure 6A                    Figure 6B

RECIRCULATING HYDRAULIC FLUID CONTROL VALVE

CROSS-REFERENCE TO RELATED APPLICATIONS

This application claims the benefit under 35 U.S.C. § 119(e) of U.S. Provisional Application No. 63/038,889 filed on Jun. 14, 2020, which application is incorporated herein by reference.

TECHNICAL FIELD

This disclosure is generally related to a hydraulic fluid control valve that can be applied to a hydraulically actuated component or system, including, but not limited to, a camshaft phaser or a cranktrain phaser for an internal combustion engine.

BACKGROUND

A hydraulic fluid control valve can manage delivery of pressurized hydraulic fluid to a hydraulically actuated component such as a camshaft phaser or a cranktrain phaser of an internal combustion engine. Pressurized hydraulic fluid in an internal combustion engine is provided by a hydraulic fluid pump that is fluidly connected to a reservoir or sump of hydraulic fluid. The size, and, thus, power requirement of the hydraulic fluid pump is dependent upon a total volume of pressurized fluid that is requested or consumed by the internal combustion engine and its associated hydraulic fluid systems. This requested or consumed hydraulic fluid can be reduced by recirculating and re-using at least some of the hydraulic fluid that is typically returned to the reservoir or sump after being utilized for actuation purposes within a hydraulically actuated component.

SUMMARY

An example embodiment of a hydraulic fluid control valve is provided that includes a valve housing and a spool. The valve housing has a first fluid port configured to be fluidly connected to a first hydraulic actuation chamber, a second fluid port configured to be fluidly connected to a second hydraulic actuation chamber, and a third fluid port arranged between the first and second fluid ports. The first and second hydraulic actuation chambers are configured to receive and exit hydraulic fluid. The third fluid port is configured to be fluidly connected to a pressurized hydraulic fluid source. The spool is disposed within a bore of the valve housing. The spool has a first aperture, a second aperture, a third aperture, a first outer annulus, a second outer annulus, and an inner fluid chamber. The second aperture can be arranged between the first and third apertures, the first aperture can be arranged at a spring end of the spool, and the third aperture can be arranged at an actuation end of the spool. The inner fluid chamber is configured to flow hydraulic fluid from the first aperture to the second aperture, and from the first aperture to the third aperture. The inner chamber is configured to continuously fluidly connect any one of the three apertures to each other in a first and a second axial position of the spool.

In the first axial position of the spool, the first aperture can be configured to deliver hydraulic fluid from the first hydraulic actuation chamber to the inner fluid chamber. In the first axial position, the first outer annulus can be configured to receive at least a portion of the hydraulic fluid from the first hydraulic actuation chamber via the second aperture and deliver the at least a portion of the hydraulic fluid to the second hydraulic actuation chamber. In the first axial position of the spool, the outer annulus can be configured to deliver a remaining portion of the hydraulic fluid from the first hydraulic actuation chamber to a vent arranged within the hydraulic fluid control valve.

In the second axial position of the spool, the third aperture can be configured to deliver at least a portion of hydraulic fluid from the second hydraulic actuation chamber to the inner fluid chamber. In the second axial position of the spool, the first outer annulus can be configured to receive the at least a portion of hydraulic fluid from the second hydraulic actuation chamber via the second aperture and deliver the at least a portion of the hydraulic fluid to the first hydraulic actuation chamber. In the second axial position of the spool, the second outer annulus is configured to deliver a remaining portion of the hydraulic fluid from the second hydraulic actuation chamber to the vent arranged within the hydraulic fluid control valve. The vent can be continuously fluidly connected to the third aperture.

With the spool in the first and second axial positions, the first outer annulus can be configured to receive hydraulic fluid from the pressurized hydraulic fluid source.

In an example embodiment, the valve housing further comprises a vent port arranged between the second fluid port and a solenoid of the hydraulic fluid control valve in a longitudinal direction of the hydraulic fluid control valve. Alternatively stated, the vent port can be arranged between the second fluid port and an actuation end of the valve housing.

In an example embodiment, the hydraulic fluid control valve includes a one-way valve arranged between the spool and an inner surface of the bore of the valve housing. The one-way valve can be configured to: i) allow hydraulic fluid to flow from the inner fluid chamber to the first and second hydraulic actuation chambers, and ii) prevent hydraulic to flow from the first outer annulus to the inner fluid chamber. The one-way valve can open in a radially outward direction to allow hydraulic fluid to flow from the inner fluid chamber to the first and second hydraulic actuation chambers.

In an example embodiment, in a first pressure state of the first hydraulic actuation chamber, the inner fluid chamber is configured to: i) receive a first amount of hydraulic fluid from the second hydraulic actuation chamber, and ii) deliver a first fraction of the first amount to an outer annulus; and, in a second pressure state of the first hydraulic actuation chamber, different than the first pressure state, the inner fluid chamber is configured to: i) receive the first amount of hydraulic fluid from the second hydraulic actuation chamber, and ii) deliver a second fraction of the first amount to the outer annulus, the second fraction greater than the first fraction.

In an example embodiment, in the first pressure state of the first hydraulic actuation chamber, the outer annulus delivers a third fraction of the first amount to a vent of the hydraulic fluid control valve; and, in the second pressure state of the first hydraulic actuation chamber, the outer annulus delivers a fourth fraction of the first amount to the vent of the hydraulic fluid control valve, the fourth fraction less than the third fraction.

An example embodiment of a hydraulic fluid control valve configured to be attached as a single unit to an internal combustion engine is provided with a coil, an armature, a push pin attached to the armature, a valve housing, and a spool actuated by the push pin. The armature is surrounded by the coil and configured to be actuated by a magnetic field generated by the coil. The spool includes an inner fluid chamber, a first outer land, a second outer land, an outer annulus formed by the first and second outer lands, and first, second, and third apertures. The inner fluid chamber is configured to: i) recirculate hydraulic fluid from either one of the first or second hydraulic actuation chambers to a remaining one of the first or second hydraulic actuation chambers; and, ii) route hydraulic fluid to a vent passage of the hydraulic fluid control valve. The inner fluid chamber has a radial outer wall that includes the first, second, and third apertures. The inner fluid chamber is configured to continuously fluidly connect the first, second, and third apertures to each other. The first and second outer lands, the radial outer wall, and the first, second, and third apertures are all formed integrally with the spool.

In an example embodiment, the hydraulic fluid control valve further comprises a second one-way valve arranged within an internal annular groove of the valve housing, the internal annular groove arranged radially outwardly of and fluidly connected to the outer annulus.

BRIEF DESCRIPTION OF THE DRAWINGS

The above mentioned and other features and advantages of the embodiments described herein, and the manner of attaining them, will become apparent and better understood by reference to the following descriptions of multiple example embodiments in conjunction with the accompanying drawings. A brief description of the drawings now follows.

FIG. 5 is a perspective view of the valve housing of FIG. 4.

FIG. 6A is a perspective view of the spool of FIG. 4.

FIG. 6B is a perspective view of the spool and the second one-way valve of FIG. 4.

DETAILED DESCRIPTION OF THE EMBODIMENTS

Figure 1:
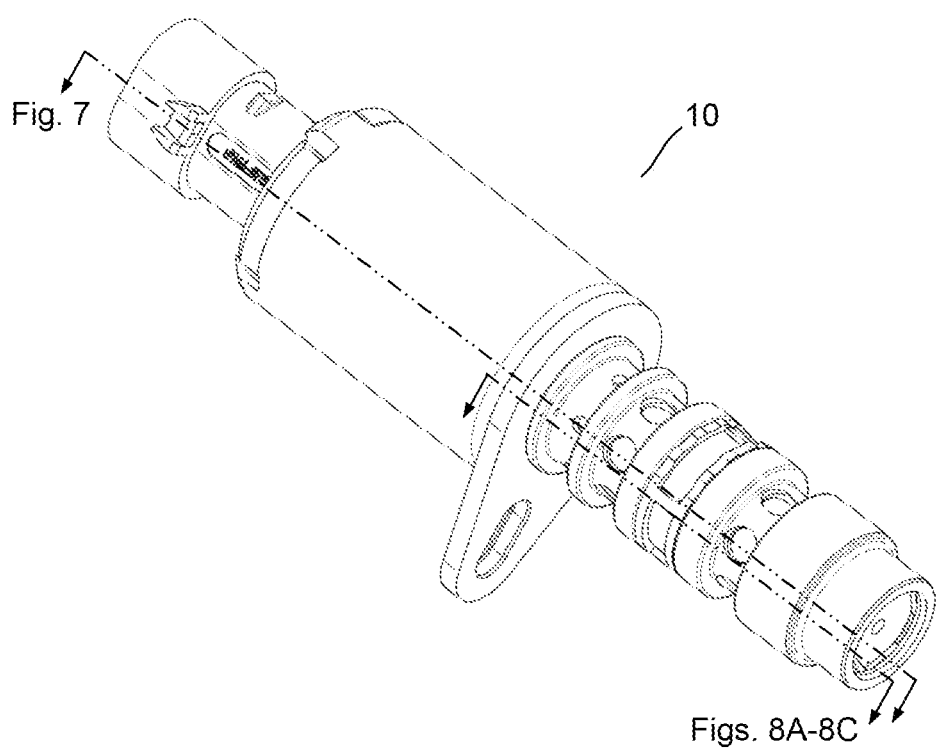
FIG. 1 is a perspective view of an example embodiment of a hydraulic fluid control valve (HFCV).

Identically labeled elements appearing in different figures refer to the same elements but may not be referenced in the description for all figures. The exemplification set out herein illustrates at least one embodiment, in at least one form, and such exemplification is not to be construed as limiting the scope of the claims in any manner. Certain terminology is used in the following description for convenience only and is not limiting. The words "inner," "outer," "inwardly," and "outwardly" refer to directions towards and away from the parts referenced in the drawings. Axially refers to directions along a diametric central axis or a rotational axis. Radially refers to directions that are perpendicular to the central axis. The words "left", "right", "up", "upward", "upper", "down", "downward", and "lower" designate directions in the drawings to which reference is made. The terminology includes the words specifically noted above, derivatives thereof, and words of similar import.

Figure 2:
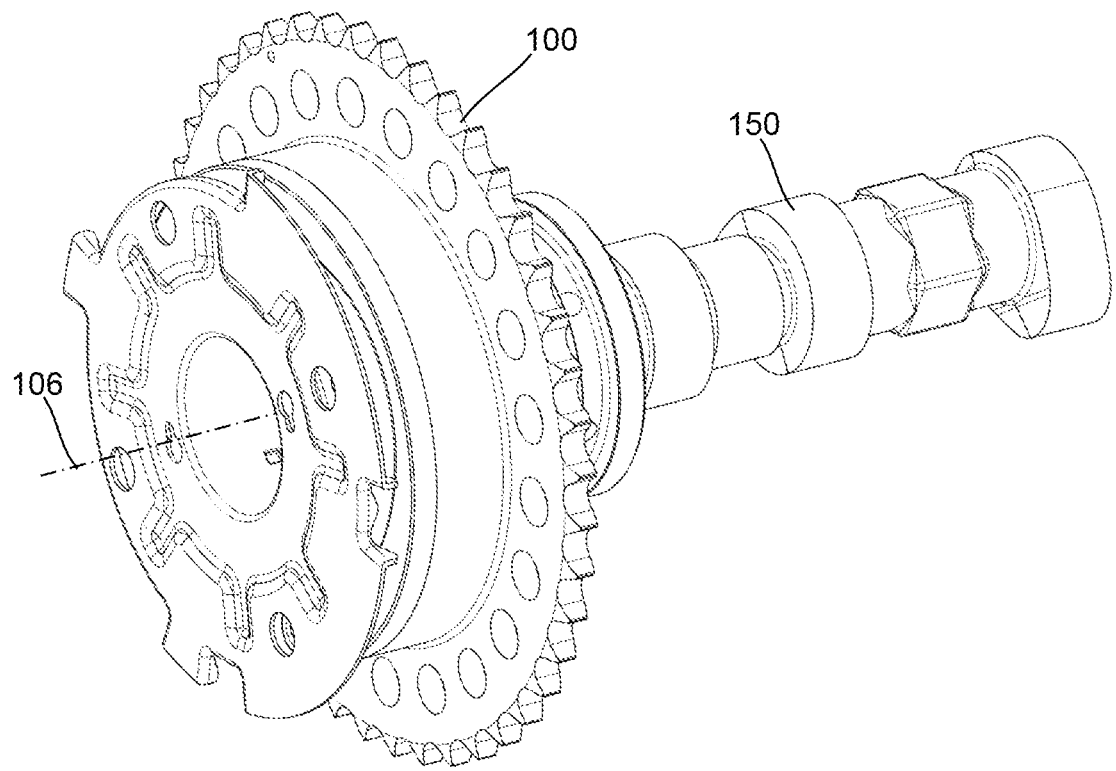
FIG. 2 is a perspective view of a camshaft phaser connected to a camshaft that can be utilized together with the HFCV of FIG. 1.
Figure 3:
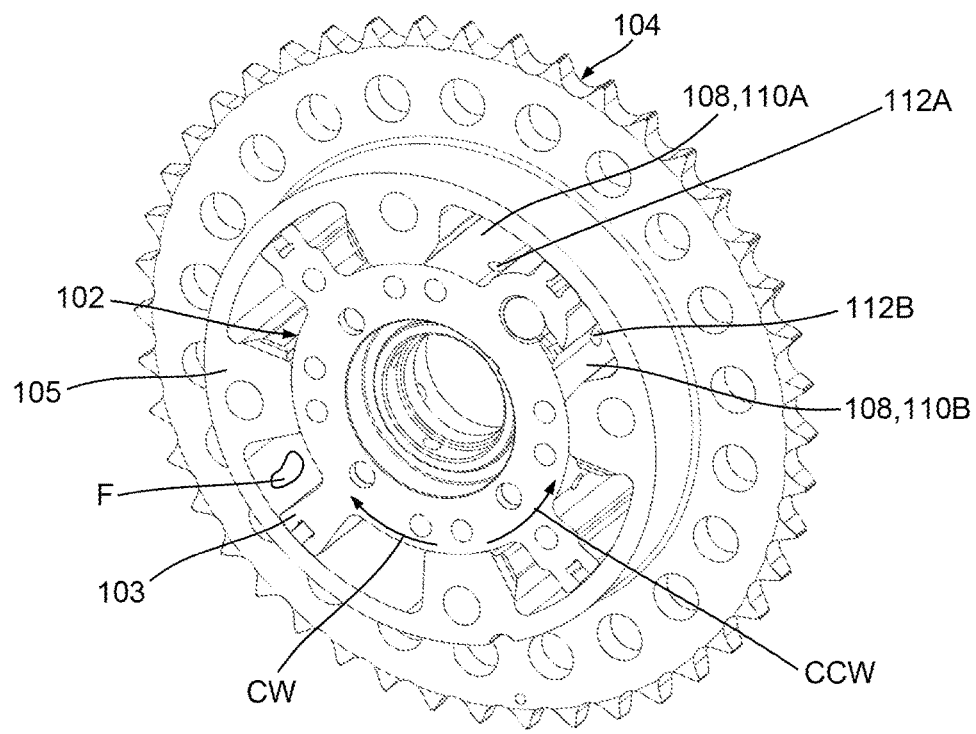
FIG. 3 is a perspective view of the camshaft phaser of FIG. 2 without end covers to show multiple hydraulic actuation chambers.
Figure 4:
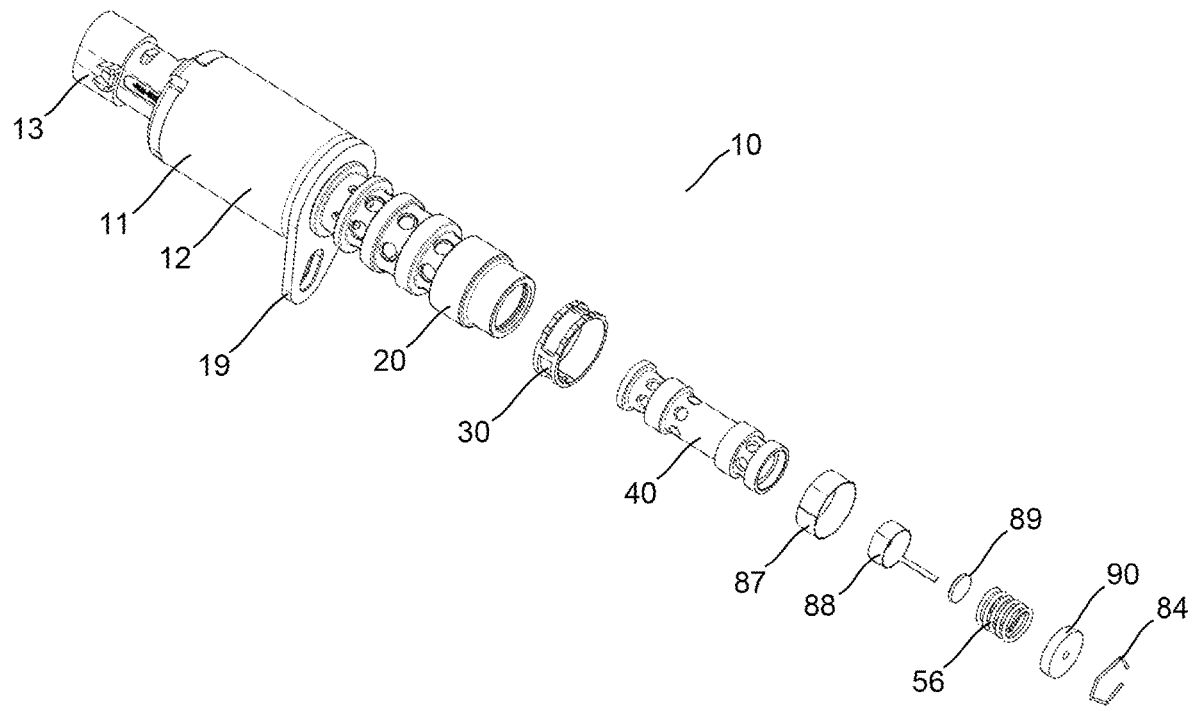
FIG. 4 is an exploded perspective view of the HFCV of FIG. 1 including a solenoid assembly, a valve housing, a spool, a first one-way valve, a second one-way valve, a bias spring, and an inlet filter.
Figure 7:
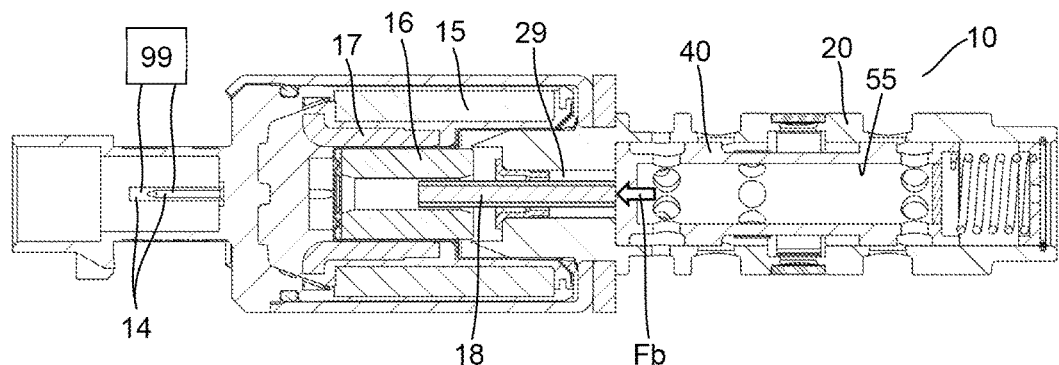
FIG. 7 is a cross-sectional view taken from FIG. 1 when the HFCV is in a de-energized state and the spool is in an extended position.
Figure 8A:
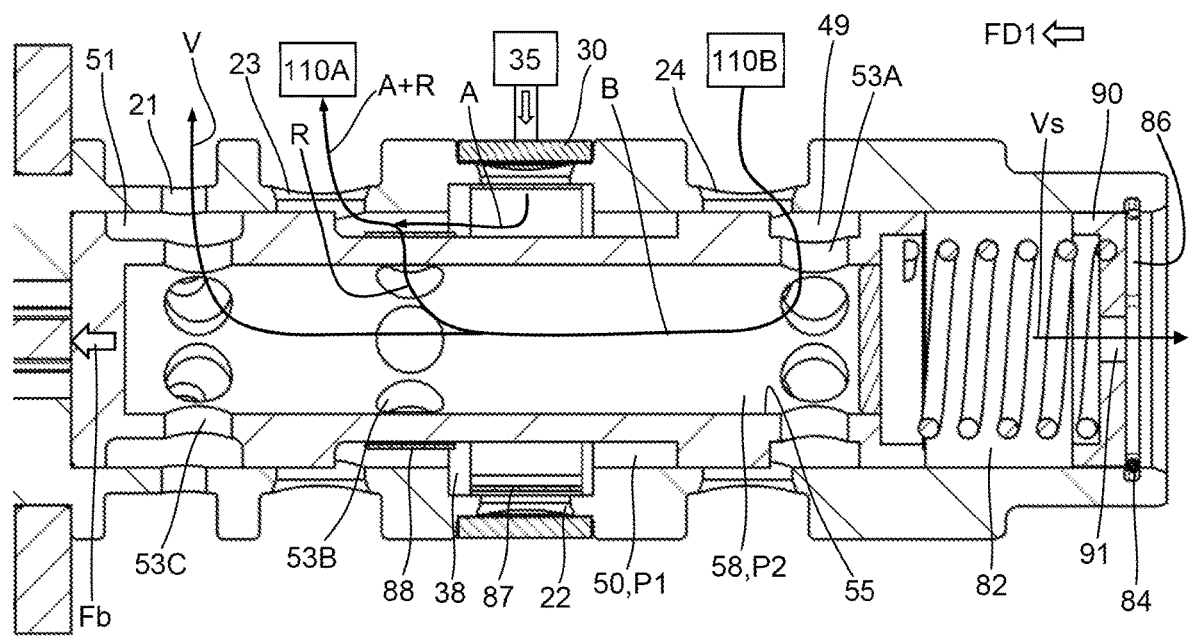
FIG. 8A is a partial cross-sectional view taken from FIG. 1 when the HFCV is in a de-energized state and the spool is in an extended position.
Figure 8B:
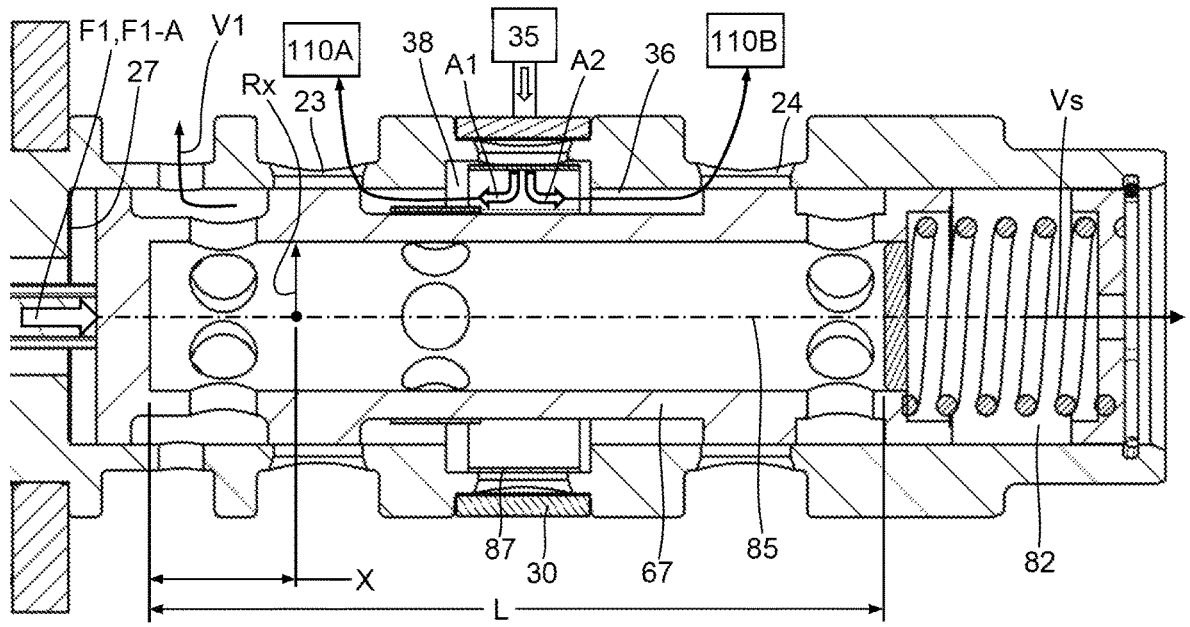
FIG. 8B is a partial cross-sectional view taken from FIG. 1 when the HFCV is in a first energized state and the spool is in a middle position.
Figure 8C:
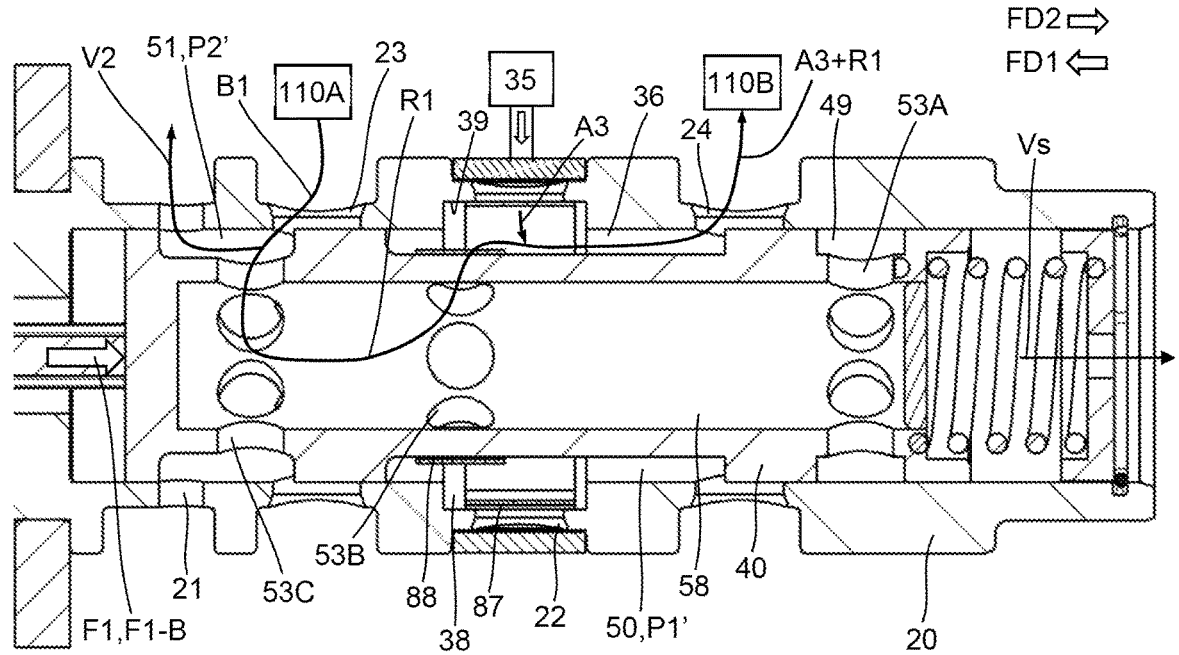
FIG. 8C is a partial cross-sectional view taken from FIG. 1 when the HFCV is in a second energized state and the spool is in a fully displaced position.

FIG. 1 is a perspective view of an example embodiment of a hydraulic fluid control valve 10 (HFCV). FIG. 2 is a perspective view of a camshaft phaser 100 attached to a camshaft 150 such that the camshaft phaser 100 is controlled by the HFCV 10 of FIG. 1 to phase the camshaft 150 relative to a crankshaft (not shown) of an internal combustion (IC) engine. FIG. 3 is a perspective view of a rotor 102 and a stator 104 of the camshaft phaser 100. FIG. 4 is an exploded perspective view of the HFCV 10 of FIG. 1 including a solenoid assembly 12, a valve housing 20, a spool 40, first and second one-way valves 87, 88, a bias spring 56, and an inlet filter 30. FIG. 5 is a perspective view of the valve housing 20 of FIG. 4. FIG. 6A is a perspective view of the spool 40 of FIG. 4. FIG. 6B is a perspective view of the spool 40 and second one-way valve 88 of FIG. 4. FIG. 7 is a cross-sectional view taken from FIG. 1 when the HFCV 10 is in a de-energized state and the spool 40 is in an extended position. FIG. 8A is a partial cross-sectional view taken from FIG. 1 when the HFCV 10 is in the de-energized state and the spool 40 is in the extended position. FIG. 8B is a partial cross-sectional view taken from FIG. 1 when the HFCV 10 is in a first energized state and the spool 40 is in a middle position. FIG. 8C is a partial cross-sectional view taken from FIG. 1 when the HFCV 10 is in a second energized state and the spool 40 is in a fully displaced position. The following discussion should be read in light of FIGS. 1-8C.

The camshaft phaser 100 is hydraulically actuated by pressurized hydraulic fluid F that is controlled by the HFCV 10 to rotate the rotor 102 either clockwise CW or counterclockwise CCW about a rotational axis 106 relative to the stator 104 via hydraulic actuation chambers 108. The hydraulic actuation chambers 108 are formed via outwardly protruding vanes 103 of the rotor 102 and inwardly protruding lugs 105 of the stator 104. As the rotor 102 is connected to the camshaft 150, clockwise CW and counterclockwise CCW rotation of the rotor 102 relative to the stator 104 can advance or retard an engine valve event with respect to a four-stroke cycle of an IC engine. Clockwise CW rotation of the rotor 102 relative to the stator 104 can be achieved by: 1). pressurization of first hydraulic actuation chambers 110A via a first hydraulic fluid gallery 112A arranged in the rotor 102; and, 2). de-pressurization of second hydraulic actuation chambers 110B via a second hydraulic fluid gallery 112B arranged in the rotor 102 that fluidly connects the second hydraulic actuation chambers 110B to a vent passage via the HFCV 10 that returns the hydraulic fluid to "tank" or a sump. Likewise, counterclockwise CCW rotation of the rotor 102 relative to the stator 104 can be achieved by: 1). pressurization of the second hydraulic actuation chambers 110B via the second hydraulic fluid gallery 112B arranged in the rotor 102; and, 2). de-pressurization of the first hydraulic actuation chambers 110A via the first hydraulic fluid gallery 112A that fluidly connects the first hydraulic actuation chambers 110A to tank via the HFCV 10. The preceding pressurization and de-pressurization actions of the first and second hydraulic actuation chambers 110A, 110B can be accomplished by the HFCV 10. The HFCV 10 is fluidly connected to a hydraulic fluid pressure source 35 such as an oil pump and can communicate electronically via terminals 14 with a controller 99 such as an engine control unit (ECU) to control the camshaft phaser 100. Although the HFCV 10 is described as controlling the camshaft phaser 100, any phase adjustment mechanism such as that utilized for a variable compression ratio system could be controlled by the HFCV 10.

The HFCV 10 includes the solenoid assembly 12, the valve housing 20, the spool 40, the bias spring 56, the inlet filter 30, the first one-way valve 87, the second one-way valve 88, a blocking disk 89, a spring support 90, and a retaining ring 84.

The solenoid assembly 12 includes an electrical connector 13, a coil 15, an armature 16, a first pole 17, a push pin 18, and a mounting plate 19. The electrical connector 13 includes two terminals 14 configured to facilitate electronic communication with the ECU 99. The push pin 18 is rigidly mounted to the armature 16 so that the push pin 18 moves in unison with the armature 16. The HFCV 10 can be described as a pulse-width modulated proportional valve that is commonly used for phaser applications, such as that for a camshaft or a variable compression ratio cranktrain.

The valve housing 20 includes, in successive longitudinal order: a retaining ring end 31, a first land 68, a second land 69, a third land, 70, a fourth land 71, a fifth land 72, a radial lip 78, and an actuator end 32. The first and second lands 68, 69 form a first segment of the valve housing 20 that defines a first outer annulus 73; the second and third lands 69, 70 form a second segment that defines a second outer annulus 74; the third and fourth lands 70, 71 form a third segment that defines a third outer annulus 75; the fourth and fifth lands 71, 72 form a fourth segment that defines a fourth outer annulus 76; and the fifth land 72 and the radial lip 78 form a fifth segment that defines a solenoid assembly groove 77. The valve housing 20 further includes: second fluid ports 24 arranged between the first and second lands 68, 69, within the first outer annulus 73; supply fluid ports 22 arranged between the second and third lands 69, 70, within the second outer annulus 74; first fluid ports 23 arranged between the third and fourth lands 70, 71 within the third outer annulus 75; and vent ports 21 arranged between the fourth and fifth lands 71, 72 within the fourth outer annulus 76.

The valve housing 20 includes a body 25 and a second pole 26 on the actuator end 32 that extends into a portion of the coil 15. A first bore 28 of the valve housing 20 extends through the body 25 such that it intersects and connects with the radially arranged supply fluid ports 22, first fluid ports 23, second fluid ports 24, and vent ports 21. A second bore 29, directly connected to the first bore 28, extends through the second pole 26. The push pin 18 moves longitudinally within the second bore 29 to actuate the spool 40.

The first one-way valve 87 is elastically disposed within an internal annular groove 38 arranged within the valve housing 20 between the second and third lands 69, 70. As shown in FIG. 8C, the first one-way valve 87 is arranged on a radial outer surface 39 of the internal annular groove 38. The internal annular groove 38 is arranged radially outwardly of and fluidly connected to a second outer annulus 50 of the spool 40. The first one-way valve 87 can be described as a compression one-way valve in that it opens radially inwardly toward a central axis 85 of the HFCV 10 when a pressure of an incoming hydraulic fluid to the HFCV 10 at the supply fluid ports 22 is greater than a pressure of a hydraulic fluid within the internal annular groove 38. In such a pressure differential condition, the one-way valve 87 compresses or deflects radially inward to allow hydraulic fluid flow into the internal annular groove 38. Furthermore, the first one-way valve 87 prevents flow out of the HFCV 10 when the pressure of the hydraulic fluid within the internal annular groove 38 exceeds the pressure of the hydraulic fluid within the supply fluid ports 22.

The spool 40 of the HFCV 10 is biased towards the solenoid assembly 12 or an actuator end 11 of the HFCV 10 by a force Fb of the bias spring 56. The pulse-width modulated solenoid assembly 12 can apply a force F1 on a push pin receiving land 47 arranged on an actuator end 48 of the spool 40 to overcome the biasing force Fb of the bias spring 56 to selectively move the spool 40 to a desired longitudinal position such as that shown in FIGS. 8B and 8C. Other forms of actuators or solenoid assemblies to move the spool 40 are also possible. A position of the spool 40 within the HFCV 10 is controlled by the ECU 99 which can control a duty cycle of the solenoid assembly 12.

The HFCV 10 could be arranged within the camshaft phaser 100; for example, the HFCV 10 could be configured as a central fastener that attaches the camshaft phaser 100 to the camshaft 150. The HFCV 10 could also be arranged at a remote location within the IC engine outside of the confines of the camshaft phaser 100. The embodiments and functional strategies described herein can also apply to other HFCV applications not described in this disclosure.

Referring to FIGS. 8A and 8C, with view to FIG. 3, different longitudinal positions of the spool 40 are shown in which pressurized hydraulic fluid is selectively delivered to either the first or second hydraulic actuation chambers 110A, 110B of the camshaft phaser 100 via: i) the first and second fluid galleries 112A, 112B arranged within the rotor 102; ii) the first and second fluid ports 23, 24 arranged on the valve housing 20; and, iii) inlet hydraulic fluid paths A, A1 of the HFCV 10.

Clockwise CW actuation of the rotor 102 relative the stator 104 requires pressurization of the first hydraulic actuation chambers 110A via the first hydraulic fluid gallery 112A and de-pressurization of the second hydraulic actuation chambers 110B via the second hydraulic fluid gallery 112B. Camshaft torques, sometimes referred to as "torsionals", act on the camshaft 150 in both clockwise and counterclockwise directions and are a result of valve train reaction forces that act on an opening flank and a closing flank of a camshaft lobe as it rotates. Assuming a clockwise rotating camshaft 150, an opening flank of a camshaft lobe can cause a counterclockwise CCW torque on the camshaft and camshaft phaser due to valve train reaction forces; furthermore, a closing flank of a camshaft lobe can cause a clockwise torque due to valve train reaction forces. In the case of a counterclockwise CCW torque, it is possible that this torque can overcome a force of a pressurized fluid F acting on a vane (or vanes) of the rotor 102 that is actuating the rotor 102 in a clockwise CW direction relative to the stator 104. In such an instance, hydraulic fluid F can be forced out of the first hydraulic actuation chambers 110A. The lobe of the camshaft 150 continues to rotate until it achieves its apex (peak lift) and then engagement of the closing flank of the lobe with the valve train causes a clockwise torque CW to act on the camshaft lobe. A counterclockwise torque CCW followed by a clockwise torque CW can induce a negative pressure in the first hydraulic actuation chambers 110A, requesting more hydraulic fluid to fill the first hydraulic actuation chambers 110A. This disclosure describes a recirculating HFCV in the following paragraphs, that can not only increase an HFCV's reactiveness to such torsionals and resultant negative pressures but can also reduce a camshaft phaser's pressurized hydraulic fluid consumption. This operating principle is achieved by routing some of the hydraulic fluid that is exiting one group of hydraulic actuation chambers to the other group of hydraulic actuation chambers for replenishment purposes.

The spool 40 includes, in successive longitudinal order: a spring end 41, a first land 42, a second land 43, a third land 44, a fourth land 45, and the push pin receiving land 47 at the actuator end 48. The first and second lands 42, 43 form a first segment of the spool 40 that defines a first outer annulus 49; the second and third lands 43, 44 form a second segment that defines a second outer annulus 50; and, the third and fourth lands 44, 45 form a third segment that defines a third outer annulus 51. The spool 40 further includes: first through-holes 53A arranged between the first and second lands 42, 43, within the first outer annulus 49; second through-holes 53B arranged between the second and third lands 43, 44, within the second outer annulus 50; third through-holes 53C arranged between the third and fourth lands 44, 45, within the third outer annulus 51. The spool 40 is closed at the actuator end 48 and open at the spring end 41; however, the blocking disk 89 is pressed into the open spring end 41 to achieve a closed condition. Other suitable means of closing the spring end 41 of the spool 40 are also possible.

The spool 40 has a longitudinal bore 54 with an inner radial surface 55, and, together with the blocking disk 89 form an inner fluid chamber 58. It could be stated that the longitudinal bore 54 defines a radial outer wall 67 of the inner fluid chamber 58 and that the first, second, and third through-holes 53A-53C, are arranged within the radial outer wall 67. The longitudinal bore 54 and the first land 42 define an annular spring receiving land 59 for a first end of the bias spring 56. It could be stated that the inner fluid chamber 58 includes the first, second, and third through-holes 53A-53C, such that the first, second, and third through-holes 53A-53C are fluidly connected to the inner fluid chamber 58. Furthermore, the first, second, and third through-holes 53A-53C can all be continuously fluidly connected to each other via the inner fluid chamber 58. That is, regardless of a position of the spool, a continuous fluid connection between any one of the three through-holes 53A-53C and any or all of the remaining two through-holes can exist, as shown in the figures. For the discussion of this disclosure, two adjacent fluid galleries that are connected to each other via a one-way fluid valve are "fluidly connected" but not "continuously fluidly connected", as there are defined fluid pressure conditions that do not yield a flow of fluid from one hydraulic fluid gallery to the other. The spool 40 and its four lands 42-45, three outer annuli 49-51, push pin receiving land 47, and first, second, and third through-holes 53A-53C can be integrally formed from one piece.

For the discussion of this disclosure, the inner fluid chamber 58 is defined by a cavity, hollow or void that directly contacts and houses a volume of hydraulic fluid, particularly hydraulic fluid that is routed to or from the hydraulic actuation chambers 108. The inner fluid chamber 58 can be continuous without interruption (or continuously open), such that its entire length L directly contacts hydraulic fluid; stated otherwise, the inner fluid chamber 58 can be continuous from the first through-hole 53A to the third through-hole 53C so that hydraulic fluid can continuously flow and be housed within the inner fluid chamber 58 from the first through-hole 53A to the third through-hole 53C without interruption. The inner fluid chamber 58 can be shaped as a bore, as shown in the figures, or any other suitable shape to receive and contact hydraulic fluid. As shown in the figures, additional components of the HFCV 10 are not installed or disposed within the inner fluid chamber 58, however, such an arrangement could be possible. As shown in FIG. 8B, a cross-sectional area of the inner fluid chamber 58 at any longitudinal position X within the length L of the inner fluid chamber 58 can be computed by multiplying a square of a radius Rx by pi (3.14159). The radius Rx extends from central axis 85, which could also be described as an actuation axis, of the HFCV 10 to the inner radial surface 55 of the bore 54 that defines the inner fluid chamber 58. The radius of the bore 54 shown in the figures is constant, however, the bore could have different radii throughout its length. Even so, the cross-sectional area of the inner fluid chamber 58 could still be defined by $((pi) \times Rx^2)$. In addition to being continuously open in a longitudinal direction from the first through-hole 53A to the third through-hole 53C, it could also be stated that the inner fluid chamber 58 is continuously open in a radial direction from the central axis 85 to the inner radial surface 55. A cutting plane that is arranged transversely to the central axis 85 and cuts through the inner fluid chamber 58 does not cut through any material (steel, plastic, etc.) from the inner radial surface 55 to the central axis 85. Therefore, the volume of the inner fluid chamber 58 can be determined by multiplying a cross-sectional area by its length L.

The spool 40 is disposed within the first bore 28 of the valve housing 20. The first, second, third, and fourth lands 42-45 of the spool 40 slidably engage the inner radial surface 33 of the first bore 28 of the valve housing 20 in a sealing manner.

The following discussion describes various hydraulic fluid paths and the respective fluid connections that are present within the HFCV 10 with the spool 40 in the three longitudinal positions shown in FIGS. 8A-8C. Each of the described hydraulic fluid paths are arranged in opposed pairs within the HFCV 10, as viewed within each of the cross-sectional views of FIGS. 8A-8C. Therefore, the fluid paths shown via sketched curves at the top of each respective figure also have symmetrical fluid paths at the bottom of each respective figure that are not sketched. Furthermore, the respective ports 21-24 and through-holes 53A, 53C of the valve housing 20 and spool 40 are symmetrically arranged so that they are also shown in opposed pairs within the cross-sectional views of FIGS. 8A-8C.

FIG. 8A shows an inlet hydraulic fluid path A, a return hydraulic fluid path B, and a primary venting hydraulic fluid path V of the HFCV 10 when the HFCV 10 is in a de-energized state and the spool 40 is in the extended position. In this extended position of the spool 40, the bias spring 56 applies a force Fb on the spool 40, such that the actuator end 48 of the spool 40 engages a base 27 (shown in FIG. 8B) of the second pole 26 of the valve housing 20.

Tracing the path of the inlet hydraulic fluid path A of FIG. 8A, hydraulic fluid flows from the hydraulic fluid pressure source 35, through the inlet filter 30, supply fluid ports 22, first one-way valve 87, and internal annular groove 38 of the valve housing 20, through the second outer annulus 50 of the spool 40, through the first fluid ports 23 and third outer annulus 75 of the valve housing 20, and to the first hydraulic actuation chambers 110A.

Tracing the path of the return hydraulic fluid path B of FIG. 8A, hydraulic fluid flows from the second hydraulic actuation chambers 110B, through the first outer annulus 73 and second fluid ports 24 of the valve housing 20, through the first outer annulus 49 and first through-holes 53A of the spool 40, and to the inner fluid chamber 58 of the spool 40; once the hydraulic fluid reaches the inner fluid chamber 58, it flows continuously without interruption in a first flow direction FD1 toward the actuator end 48 of the spool 40 until reaching a longitudinal position of the second through-holes 53B. The phrase "flows continuously without interruption" is meant to describe flow within the continuously hollow inner fluid chamber 58, which is void of internal components that hydraulic fluid would have to flow around, inside of, or through in order to reach the longitudinal position of the second through-holes 53B. From this longitudinal position within the inner fluid chamber 58, the return hydraulic fluid path B splits into two hydraulic fluid paths: a recirculation hydraulic fluid path R and a primary venting hydraulic fluid path V.

The recirculation hydraulic fluid path R continues through the second through-holes 53B and second one-way valve 88 of the spool 40, through the first fluid ports 23 and third outer annulus 75 of the valve housing 20, and to the first hydraulic actuation chambers 110A. It could be stated that the recirculation hydraulic fluid path R merges with the inlet hydraulic path A within the second outer annulus 50 of the spool 40, forming a combined hydraulic fluid path A+R to the first hydraulic actuation chambers 110A.

The primary venting hydraulic fluid path V continues without interruption in the first flow direction FD1 until reaching a longitudinal position of the third through-holes 53C; the primary venting hydraulic fluid path V extends through the third through-holes 53C and third outer annulus 51 of the spool 40, and through the vent ports 21 and fourth outer annulus 76 of the valve housing 20. The third through-holes 53C are sealingly isolated from the push pin receiving land 47 (and thus also from the push pin 18) by the third and fourth lands 44, 45 that slidably engage the inner radial surface 33 of the first bore 28 of the valve housing 20 in a sealing manner. Hydraulic fluid that exits the fourth outer annulus 76 can be routed to a sump of the hydraulic fluid pressure source 35 such as an oil pump. The primary venting hydraulic fluid path V can be defined as a hydraulic fluid path that facilitates venting of (or sending to tank) hydraulic fluid which is exited from the second hydraulic actuation chambers 110B but not recirculated to the first hydraulic actuation chambers 110A.

A secondary venting hydraulic fluid path Vs is also shown in FIG. 8A that extends from a spring well 82 formed between the spring end 41 of the spool 40 and the spring support 90. The spring support 90 is axially supported by the retaining ring 84 received by a groove arranged at the retaining ring end 31 of the valve housing 20. From the spring well 82, the secondary venting hydraulic fluid path Vs extends through an exit port 91 of the spring support 90 and an inner open area 86 of the retaining ring 84. Vented or exiting fluid from the HFCV 10 can be routed to the sump of the hydraulic fluid pressure source 35 such as an oil pump. The secondary venting hydraulic fluid path Vs serves as an exit for internal leakage that occurs such as that between the first land 42 of the spool 40 and the inner radial surface 33 of the first bore 28 of the valve housing 20.

The recirculation hydraulic fluid path R facilitates efficient recycling of hydraulic fluid from the second hydraulic actuation chambers 110B to the first hydraulic actuation chambers 110A. The amount of hydraulic fluid that is delivered to the first hydraulic actuation chambers 110A from the second hydraulic actuation chambers 110B via the recirculation hydraulic fluid path R is dependent on need, or a pressure differential condition between the inner fluid chamber 58 of the spool 40 and the second outer annulus 50 of the spool 40. In order for positive hydraulic fluid flow to occur from the inner fluid chamber 58 to the second outer annulus 50, a hydraulic fluid pressure P2 within the inner fluid chamber 58 needs to be greater than a hydraulic fluid pressure Pb within the second outer annulus 50. Such a pressure differential condition defines a positive pressure differential. Furthermore, an amount of hydraulic fluid delivered from the second hydraulic actuation chambers 110B to the first hydraulic actuation chambers 110A in a first positive pressure differential condition $\Delta P1$ is different than an amount of hydraulic fluid delivered from the second hydraulic actuation chambers 110B to the first hydraulic actuation chambers 110A in a second positive pressure differential condition $\Delta P2$ that is different than the first positive pressure differential condition $\Delta P1$. Correspondingly, an amount of hydraulic fluid delivered to the primary venting hydraulic fluid path V from the inner fluid chamber 58 also depends on the pressure differential between the inner fluid chamber 58 and the second outer annulus 50, and therefore varies accordingly. This relationship is shown in mathematical equation form below.

X=amount of hydraulic fluid exiting second hydraulic actuation chambers 110B and delivered to inner fluid chamber 58 of spool 40 (path B)

Y=first fractional amount of X that is recirculated from second hydraulic actuation chambers 110B to the first hydraulic actuation chambers 110A (path R)

Z=second fractional amount of X that is exiting the HFCV 10 (path V)

$\Delta P$=hydraulic fluid pressure of inner fluid chamber 58 (P2)–hydraulic fluid pressure of second outer annulus 50 (P1)

$$X=Y+Z$$

For $\Delta P1$=0.5 bar:

$$X=Y1+Z1$$

For $\Delta P2$=1 bar:

$$X=Y2+Z2$$

Where: Y2>Y1 and Z2<Z1

The above positive pressure differential examples between the inner fluid chamber 58 and the second outer annulus 50 illustrate how an amount of hydraulic fluid within the return hydraulic fluid path B is divided amongst the recirculation hydraulic fluid path R and the primary venting hydraulic fluid path V. In such positive pressure differential examples, an amount of fluid flow of the return hydraulic fluid path B can be divided into two fluid flow amounts, a first fractional fluid flow amount Y within the recirculation hydraulic fluid path R and a second fractional fluid flow amount Z within the primary venting hydraulic fluid path V. The first fractional fluid flow amount Y can vary from zero to X, an amount equal to that of the fluid flow amount within the return hydraulic fluid path B. The second fractional fluid flow amount Z can also vary from zero to X, an amount equal to that of the fluid flow amount with the return hydraulic fluid path B. Referencing the two $\Delta P$ examples above, for an increasing positive $\Delta P$ across the inner fluid chamber 58 and the second outer annulus 50, the first fractional amount Y increases and the second fractional amount Z decreases. Furthermore, for a decreasing positive $\Delta P$, the first fractional amount Y decreases and the second fractional amount Z increases. It could be stated that an amount of recirculated hydraulic fluid delivered to the first hydraulic actuation chambers 110A via recirculation hydraulic fluid path R varies according to need.

FIG. 8B shows a cross-sectional view of the HFCV 10 when the HFCV 10 is in the first energized state and the spool 40 is in the middle position. The middle position of the spool 40 is achieved when the pulse-width modulated solenoid assembly 12 applies a first force F1-A on the actuator end 48 of the spool 40 to overcome the biasing force Fb of the bias spring 56. As shown in FIG. 8B, a slight overlap occurs between the second outer annulus 50 of the spool 40 and the first and second fluid ports 23, 24, facilitating delivery of pressurized hydraulic fluid to both the first and second hydraulic actuation chambers 110A, 110B via first and second inlet hydraulic fluid paths A1, A2. Thus, the middle position of the spool 40 can be used to maintain a phasing position of the camshaft phaser 100, or stated otherwise, maintain a constant rotational position of the rotor 102 relative to the stator 104. With the spool 40 in the middle position, a secondary venting hydraulic fluid path V1 is active along with the secondary venting hydraulic fluid path Vs that was previously described for FIG. 8A. Each of these secondary venting paths V1, Vs vent or exit hydraulic fluid that results from internal leakage of the HFCV 10 that flows respectively to the fourth outer annulus 76 of the valve housing 20 and the spring well 82.

The described middle position of the spool 40 and corresponding flows represents one of many design scenarios. In another example embodiment, no overlap between the second outer annulus 50 and first and second fluid ports 23, 24 is present, resulting in no flow of hydraulic fluid to the first and second hydraulic actuation chambers 110A, 110B.

FIG. 8C shows a cross-sectional view of the HFCV 10 when the HFCV 10 is in the second energized state and the spool 40 is selectively moved to the fully displaced position. In this fully displaced position of the spool 40, the pulse-width modulated solenoid assembly 12 applies a second force F1-B, on the actuator end 48 of the spool 40 to overcome the biasing force Fb of the bias spring 56. The second force F1-B is greater in magnitude than the previously described first force F1-A. The following discussion describes various hydraulic fluid paths and the respective fluid connections that are present with the spool 40 in this fully displaced position.

FIGS. 8C's cross-sectional view shows an inlet hydraulic fluid path A3 and a return hydraulic fluid path B1 of the HFCV 10. Each of these hydraulic fluid paths A3, B1 are arranged in opposed pairs within the HFCV 10, as viewed within the cross-sectional view of FIG. 8C.

Tracing the path of the inlet hydraulic fluid path A3 of FIG. 8C, hydraulic fluid flows from the hydraulic fluid pressure source 35, through the inlet filter 30, supply fluid ports 22, first one-way valve 87, and internal annular groove 38 of the valve housing 20, through the second outer annulus 50 of the spool 40, and through the second fluid ports 24 and first outer annulus 73 of the valve housing 20, and to the second hydraulic actuation chambers 110B.

Tracing the path of the return hydraulic fluid path B1 of FIG. 8C, hydraulic fluid flows from the first hydraulic actuation chambers 110A, through the third outer annulus 75 and first fluid ports 23 of the valve housing 20, and to the third outer annulus 51 of the spool 40; within the third outer annulus 51, the return hydraulic fluid path B1 splits into two hydraulic fluid paths: a recirculation hydraulic fluid path R1 and a primary venting hydraulic fluid path V2.

The recirculation hydraulic fluid path R1 starts from the third outer annulus 51 of the spool 40 and moves through the third through-holes 53C until reaching the inner fluid chamber 58 of the spool 40; once the hydraulic fluid reaches the inner fluid chamber 58, it flows continuously without interruption in a second flow direction FD2 toward the spring end 41 of the spool 40 until reaching a longitudinal position of the second through-holes 53B; from the inner fluid chamber 58, the hydraulic fluid flows through the second through-holes 53B, second one-way valve 88, and second outer annulus 50 of the spool 40, through the second fluid ports 24 and first outer annulus 73 of the valve housing 20, and to the second hydraulic actuation chambers 110B. It could be stated that the recirculation hydraulic fluid path R1 merges with the inlet hydraulic fluid path A3 within the second outer annulus 50 of the spool 40, forming a combined hydraulic fluid path A3+R1 to the second actuation chambers 110B.

The recirculation hydraulic fluid path R1 facilitates efficient recycling of hydraulic fluid from the first hydraulic actuation chambers 110A to the second hydraulic actuation chambers 110B. The amount of hydraulic fluid that is delivered to the second hydraulic actuation chambers 110B from the first hydraulic actuation chambers 110A via the recirculation hydraulic fluid path R1 is dependent on need, or, on a pressure differential between the third outer annulus 51 of the spool 40 and the second outer annulus 50 of the spool 40. In an example embodiment, for flow to occur within the recirculation hydraulic fluid path R1 from the third outer annulus 51 to the second outer annulus 50 (via the inner fluid chamber 58), a hydraulic fluid pressure P2' of the third outer annulus 51 is greater than a hydraulic pressure P1' of the second outer annulus 50. Furthermore, an amount of hydraulic fluid delivered from the first hydraulic actuation chambers 110A to the second hydraulic actuation chambers 110B in a first positive pressure differential condition $\Delta P1'$ is different than an amount of hydraulic fluid delivered from the first hydraulic actuation chambers 110A to the second hydraulic actuation chambers 110B in a second positive pressure differential condition $\Delta P2'$ that is different than the first positive pressure differential condition $\Delta P1'$. Correspondingly, an amount of hydraulic fluid delivered to the primary venting hydraulic fluid path V2 from the third outer annulus 51 also depends on the pressure differential between the third outer annulus 51 and the second outer annulus 50, and therefore varies accordingly. This relationship is shown in mathematical equation form below.

X'=amount of hydraulic fluid exiting first hydraulic actuation chambers 110A and delivered to third outer annulus 51 of spool 40 (path B1)

Y'=first fractional amount of X' that is recirculated from first hydraulic actuation chambers 110A to the second hydraulic actuation chambers 110B (path R1)

Z'=second fractional amount of X' that is exiting the HFCV 10 (path V2)

$\Delta P'$=hydraulic fluid pressure of third outer annulus 51 (P2')−hydraulic fluid pressure of second outer annulus 50 (P1')

$$X'=Y'+Z'$$

For $\Delta P1'$=0.5 bar:

$$X'=Y1'+Z1'$$

For $\Delta P2'$=1 bar:

$$X'=Y2'+Z2'$$

Where: Y2'>Y1' and Z2'<Z1'

The above positive pressure differential examples between the third outer annulus 51 and the second outer annulus 50 of the spool 40 illustrate how an amount of hydraulic fluid within the return hydraulic fluid path B1 is divided amongst the recirculation hydraulic fluid path R1 and the primary venting hydraulic fluid path V2. In such positive pressure differential examples, an amount of fluid flow of the return hydraulic fluid path B1 can be divided into two fluid flow amounts, a first fractional fluid flow amount Y' within the recirculation hydraulic fluid path R1 and a second fractional fluid flow amount Z' within the primary venting hydraulic fluid path V2. The first fractional fluid flow amount Y' can vary from zero to X', an amount equal to that of the fluid flow within the return hydraulic fluid path B1. The second fractional fluid flow amount Z' can also vary from zero to X', an amount equal to that of the fluid flow within the return hydraulic fluid path B1. Referencing the two ΔP examples above, for an increasing positive ΔP across the third outer annulus 51 and the second outer annulus 50 of the spool 40, the first fractional amount Y' increases and the second fractional amount Z' decreases. Furthermore, for a decreasing positive ΔP, the first fractional amount Y' decreases and the second fractional amount Z' increases. It could be stated that an amount of recirculated hydraulic fluid delivered to the second hydraulic actuation chambers 110B via recirculation hydraulic fluid path R1 varies according to need.

The primary venting hydraulic fluid path V2 starts from the third outer annulus 51 of the spool 40 and moves through the vent ports 21 and fourth outer annulus 76 of the valve housing 20. Hydraulic fluid that exits the fourth outer annulus 76 can be routed to a sump of the hydraulic fluid pressure source 35 such as an oil pump. The primary venting hydraulic fluid path V2 can be defined as a hydraulic fluid path that facilitates venting of (or sending to tank) hydraulic fluid which is exited from the first hydraulic actuation chambers 110A but not recirculated to the second hydraulic actuation chambers 110B.

The secondary hydraulic fluid path Vs, as previously described, is also active within the fully displaced position of the spool 40 shown in FIG. 8C. This secondary hydraulic fluid path Vs can vent or exit hydraulic fluid that results from internal leakage of the HFCV 10 that flows to the spring well 82 of the HFCV 10.

The second one-way valve 88 is elastically disposed around the second outer annulus 50 of the spool 40, such that it wraps around a radial inner surface 60 of the second outer annulus 50. The second one-way valve 88 includes a first axial leg 88A and a second axial leg 88B to axially locate the second one-way valve 88 in its proper location so that it controls hydraulic fluid flow through the second through-holes 53B of the spool 40. The second one-way valve 88 can be described as an expansion one-way valve because it opens in a radially outward direction away from the central axis 85 of the HFCV 10 when a pressure of a hydraulic fluid within the inner fluid chamber 58 of the spool 40 exceeds a pressure of a hydraulic fluid within the second outer annulus 50 of the spool 40. Furthermore, the second one-way valve 88 prevents flow into the inner fluid chamber 58 (via the second through-holes 53B) when the pressure of the hydraulic fluid within the second outer annulus 50 exceeds that of the hydraulic fluid within the inner fluid chamber 58. The second one-way valve 88 can utilize the inner radial surface 33 of the first bore 28 of the valve housing 20 as a radial stop in an opening direction.

It could be stated that the spool 40 and the valve housing 20 form an annular fluid cavity 36 that: i) receives incoming hydraulic fluid from the hydraulic fluid pressure source 35; ii) receives recirculating hydraulic fluid from either one of the first or second hydraulic actuation chambers 110A, 110B; and iii) delivers hydraulic fluid to either one of the first or second hydraulic actuation chambers 110A, 110B. The annular fluid cavity 36 can include the second outer annulus 50 of the spool 40 and the internal annular groove 38 of the valve housing 20, the shapes of which can vary from that which is shown in the figures. The first one-way valve 87 can be arranged on a radial inner side (the radial inner surface 60 of the second outer annulus 50) of the annular fluid cavity 36, and second one-way valve 88 can be arranged on respective radial outer side (radial outer surface 39 of internal annular groove 38) of the annular fluid cavity 36.

The sizes and/or diameter of the through-apertures and openings of the venting hydraulic fluid paths V, V2 of FIGS. 8A and 8C, which can be referred to as primary venting hydraulic fluid paths V, V2, can be adjusted to tune the amount of recirculation that occurs within the HFCV 10. This amount could be dependent upon the magnitude of the camshaft torsionals acting on the camshaft phaser; for example, higher camshaft torsionals may require a smaller sized vent through-aperture. Furthermore, in some applications the vent ports 21 could be eliminated from the valve housing 20.

The flow paths shown in the figures are symmetrically arranged such that a transverse cutting plane that intersects the central axis 85 of the HFCV 10 and one of the flow paths also intersects a second instance of the same flow path. Other arrangements of flow paths are also possible, including non-symmetrical arrangements.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A hydraulic fluid control valve, comprising:
a valve housing having:
  a first fluid port configured to be fluidly connected to a first hydraulic actuation chamber;
  a second fluid port configured to be fluidly connected to a second hydraulic actuation chamber, the first and second hydraulic actuation chambers configured to receive and exit hydraulic fluid; and
  a third fluid port arranged between the first and second fluid ports, the third fluid port configured to be fluidly connected to a pressurized hydraulic fluid source; and
a spool disposed within a bore of the valve housing such that the spool and bore define a spring well, the spool having:

a first aperture arranged at a spring end of the spool, the first aperture sealingly separated from the spring well;
a second aperture;
a third aperture, the second aperture arranged between the first and third apertures;
a first outer annulus fluidly connected to the third fluid port; and,
an inner fluid chamber configured to flow hydraulic fluid from: i) the first aperture to the second aperture, and ii) from the first aperture to the third aperture; and,
in a first axial position of the spool:
the first aperture is configured to deliver hydraulic fluid from the first hydraulic actuation chamber to the inner fluid chamber; and,
the first outer annulus is configured to receive at least a portion of the hydraulic fluid from the first hydraulic actuation chamber via the second aperture and deliver the at least a portion of the hydraulic fluid to the second hydraulic actuation chamber; and,
in a second axial position of the spool:
the third aperture is configured to deliver at least a portion of hydraulic fluid from the second hydraulic actuation chamber to the inner fluid chamber; and,
the first outer annulus is configured to receive the at least a portion of hydraulic fluid from the second hydraulic actuation chamber and deliver the at least a portion of the hydraulic fluid from the second hydraulic actuation chamber to the first hydraulic actuation chamber.

2. The hydraulic fluid control valve of claim 1, wherein in the second axial position of the spool, the first outer annulus receives the at least a portion of hydraulic fluid from the second hydraulic actuation chamber via the second aperture.

3. The hydraulic fluid control valve of claim 1, wherein in the first and second axial positions, the first outer annulus is configured to receive hydraulic fluid from the pressurized hydraulic fluid source.

4. The hydraulic fluid control valve of claim 1, wherein the first aperture is arranged at the spring end of the spool, and the third aperture is arranged at an actuation end of the spool.

5. The hydraulic fluid control valve of claim 1, wherein the inner fluid chamber is configured to continuously fluidly connect any one of the first, second, or third apertures to each other in the first and second axial positions of the spool.

6. The hydraulic fluid control valve of claim 1, wherein the spool further comprises a second outer annulus, and:
in the first axial position of the spool, the inner fluid chamber is configured to deliver a remaining portion of the hydraulic fluid from the first hydraulic actuation chamber to a vent arranged within the hydraulic fluid control valve; and,
in the second axial position of the spool, the second outer annulus is configured to deliver a remaining portion of the hydraulic fluid from the second hydraulic actuation chamber to the vent arranged within the hydraulic fluid control valve.

7. The hydraulic fluid control valve of claim 6, wherein the vent is continuously fluidly connected to the third aperture.

8. The hydraulic fluid control valve of claim 6, wherein the valve housing further comprises a vent port arranged between the second fluid port and a solenoid of the hydraulic fluid control valve in a longitudinal direction of the hydraulic fluid control valve.

9. The hydraulic fluid control valve of claim 1, further comprising a one-way valve arranged between the spool and an inner surface of the bore of the valve housing, the one-way valve configured to: i) allow hydraulic fluid to flow from the inner fluid chamber to the first and second hydraulic actuation chambers, and ii) prevent hydraulic to flow from the first outer annulus to the inner fluid chamber.

10. The hydraulic fluid control valve of claim 1, wherein the first aperture is sealingly separated from the spring well via an outer land of the spool configured to slidably and sealingly engage the bore of the valve housing.

11. A hydraulic fluid control valve, comprising:
a valve housing having:
a first fluid port configured to be fluidly connected to a first hydraulic actuation chamber;
a second fluid port configured to be fluidly connected to a second hydraulic actuation chamber, the first and second hydraulic actuation chambers configured to receive and exit hydraulic fluid; and
a spool disposed within a bore of the valve housing, the spool having:
a first aperture;
a second aperture;
an outer annulus; and,
an inner fluid chamber arranged radially inwardly of the outer annulus; and
in a first axial position of the spool, the inner fluid chamber is configured to recirculate hydraulic fluid from the first hydraulic actuation chamber to the second hydraulic actuation chamber, the inner fluid chamber configured to receive the hydraulic fluid from the first hydraulic actuation chamber via the first aperture; and
in a second axial position of the spool, the inner fluid chamber is configured to recirculate hydraulic fluid from the second hydraulic actuation chamber to the first hydraulic actuation chamber, the inner fluid chamber configured to receive the hydraulic fluid from the second hydraulic actuation chamber via the second aperture; and,
each of the first aperture and the second aperture are continuously fluidly connected to each other when the spool is in at least one of the first axial position or the second axial position; or
the inner fluid chamber is continuously open from the first aperture to the second aperture; and
wherein the valve housing is absent of a vent port.

12. A hydraulic fluid control valve configured to be attached as a single unit to an internal combustion engine, the hydraulic fluid control valve comprising:
a coil;
an armature surrounded by the coil and configured to be actuated by a magnetic field generated by the coil;
a push pin attached to the armature;
a valve housing having:
a first radial fluid port configured to be fluidly connected to a first hydraulic actuation chamber;
a second radial fluid port configured to be fluidly connected to a second hydraulic actuation chamber; and,
a third radial fluid port arranged between the first and second radial fluid ports, the third radial fluid port configured to be fluidly connected to a pressurized hydraulic fluid source; and, a spool disposed within a bore of the valve housing and actuated by the push pin, the spool having:
  a first outer land;
  a second outer land;
  an outer annulus formed by the first and second outer lands; and
  an inner fluid chamber configured to directly contact hydraulic fluid, the inner fluid chamber having a radial outer wall including:
    a first aperture arranged at a first spring end;
    a second aperture; and
    a third aperture arranged at a second end, opposite the first spring end, and the third aperture sealingly separated from the push pin; and
  the inner fluid chamber configured to: i) continuously fluidly connect the first, second, and third apertures to each other, ii) recirculate hydraulic fluid from either one of the first or second hydraulic actuation chambers to a remaining one of the first or second hydraulic actuation chambers, and iii) route hydraulic fluid to a vent passage of the hydraulic fluid control valve; and
  the first and second outer lands, the radial outer wall, and the first, second, and third apertures are all formed integrally with the spool.

13. The hydraulic fluid control valve of claim 12, wherein the vent passage exits through a fourth radial fluid port of the valve housing, the fourth radial fluid port arranged between the second radial fluid port and the coil of the hydraulic fluid control valve.

14. The hydraulic fluid control valve of claim 12, further comprising a one-way valve arranged between the spool and an inner radial surface of the bore of the valve housing.

15. The hydraulic fluid control valve of claim 14, wherein the one-way valve is arranged within the outer annulus of the spool.

16. The hydraulic fluid control valve of claim 15, wherein the one-way valve includes an axial leg configured to axially locate the one-way valve within the outer annulus.

17. The hydraulic fluid control valve of claim 12, wherein the outer annulus is fluidly connected to the third radial fluid port.

18. The hydraulic fluid control valve of claim 12, wherein the third aperture is sealingly separated from the push pin via a third outer land of the spool configured to slidably and sealingly engage the bore of the valve housing.

* * * * *